United States Patent [19]

Reed et al.

[11] Patent Number: 4,947,260
[45] Date of Patent: Aug. 7, 1990

[54] METHOD AND APPARATUS FOR GENERATING COMPOSITE IMAGES

[75] Inventors: Alastair Reed, British Columbia, Canada; Peter W. Stansfield; Martin Rosen, both of Hertfordshire, England

[73] Assignee: Crosfield Electronics Limited, London, England

[21] Appl. No.: 366,982

[22] Filed: Jun. 16, 1989

[30] Foreign Application Priority Data

Jun. 16, 1988 [GB] United Kingdom ............... 8814288

[51] Int. Cl.$^5$ .............................................. H04H 1/40
[52] U.S. Cl. ..................................... 358/447; 353/450
[58] Field of Search ............... 358/447, 480, 448, 461

[56] References Cited

U.S. PATENT DOCUMENTS

| | | | |
|---|---|---|---|
| 4,356,555 | 10/1982 | Ejiri et al. | 358/447 |
| 4,682,869 | 7/1987 | Itoh et al. | 358/447 |
| 4,849,822 | 7/1989 | Sing | 358/443 |
| 4,872,064 | 10/1989 | Tutt et al. | 358/447 |
| 4,873,577 | 10/1989 | Chamzas | 358/447 |

FOREIGN PATENT DOCUMENTS 8706789 11/1987 PCT Int'l Appl. .

Primary Examiner—Edward L. Coles, Sr.
Attorney, Agent, or Firm—Sughrue, Mion, Zinn, Macpeak & Seas

[57] ABSTRACT

A method of generating a composite image on a record medium at a first resolution resulting from two subsidiary images defined by pixels at a second resolution lower than the first. The method comprises generating an array of control data at the second resolution, the control data indicating the relative locations of the subsidiary images in the composite image at the first and second resolutions, generating data defining the composite image at the second resolution under the control of the control data, interpolating the second resolution composite image up to the first resolution, the relative locations of the subsidiary images at the first resolution being determined in accordance with the control data, and causing the first resolution composite image to be recorded on the record medium.

6 Claims, 3 Drawing Sheets

METHOD AND APPARATUS FOR GENERATING COMPOSITE IMAGES

FIELD OF THE INVENTION

The invention relates to methods and apparatus for generating a composite image on a record medium. The invention is particularly applicable to page planning techniques in which different subsidiary images are combined together to yield a final page.

DESCRIPTION OF THE PRIOR ART

Conventionally, page planning is performed at a relatively low resolution compared with the output resolution following which a composite image of the page is generated at the high resolution for subsequent output onto a record medium such as a laser sensitive sheet. In the case of relatively complex pages, it is not possible to generate and record the composite page at high resolution in real time. At present, the only available option is to assemble the subsidiary images at the high resolution and to gradually store the entire high resolution page following which the stored page is used to control an output scanner. The disadvantage of this is that a very large store is required for the data and the process takes a considerable time.

SUMMARY OF THE INVENTION

In accordance with one aspect of the present invention, a method of generating a composite image on a record medium at a first resolution resulting from two subsidiary images defined by pixels at a second resolution lower than the first comprises generating an array of control data at the second resolution, the control data indicating the relative locations of the subsidiary images in the composite image at the first and second resolutions, generating data defining the composite image at the second resolution under the control of the control data, interpolating the second resolution composite image up to the first resolution, the relative locations of the subsidiary images at the first resolution being determined in accordance with control data, and causing the first resolution composite image to be recorded on the record medium.

In accordance with the second aspect of the present invention, apparatus for generating a composite image on a record medium at a first resolution resulting from two subsidiary images defined by pixels at a second resolution lower than the first comprises storage means for storing digital data defining the subsidiary images and for storing an array of control data at the second resolution, the control data indicating the relative locations of the subsidiary images in the composite image at the first and second resolutions, and processing means for generating data defining the composite image at the second resolution under the control of the control data, for interpolating the second resolution composite image up to the first resolution, the relative locations of the subsidiary images at the first resolution being determined in accordance with the control data, and for causing an output device to record the composite image at the first resolution on a record medium.

This invention makes use of an array of control data or mask defined by mask pixels at the second, lower resolution. The data in each pixel of the mask can define at least two properties of the composite image firstly due to the location of the pixel within the mask and secondly due to the value of the data itself.

Typically, each pixel of the array of control data contains data comprising at least two bits which are used to define the content of each second resolution pixel located within the area defined by the control data array pixel. In a simple case, where a "hard" edge is required between the subsidiary images, the control data array pixels which overlap the edge may define those first resolution pixels located within the control data array pixel which are defined by one of the subsidiary images, the remaining first resolution pixel being defined by the other subsidiary image.

In a more complex arrangement, where a "soft" edge between the subsidiary images is required, the method may further comprise, prior to interpolating the composite image, the step of interpolating the control data array up to the first resolution and subsequently interpolating the second resolution composite image up to the first resolution under the control of the interpolated control data array, the data content of each first resolution pixel of the interpolated control data array defining the relative proportions of the two subsidiary images at that pixel.

The advantage of the invention is that the interpolating and recording steps can occur in real time.

It should be understood that the term "interpolation" is used in a broad sense to include conventional interpolating techniques and also replication.

Typically, the step of generating the array of control data at the second resolution comprises generating the control data array at the first resolution and subsequently reducing the resolution of the control data array. This reduction may be achieved by averaging groups of the first resolution pixels of the control data array.

Typically, the record medium will comprise a radiation sensitive medium such as a film but the record medium could also be provided by a digital data store.

The "image" referred to may comprise a single colour separation of a multiple colour component picture or a monochrome image.

BRIEF DESCRIPTION OF THE DRAWINGS

Some examples of methods and apparatus according to the invention will now be described with reference to the accompanying drawings, in which.

DETAILED DESCRIPTION OF THE EMBODIMENT

Figure 1:
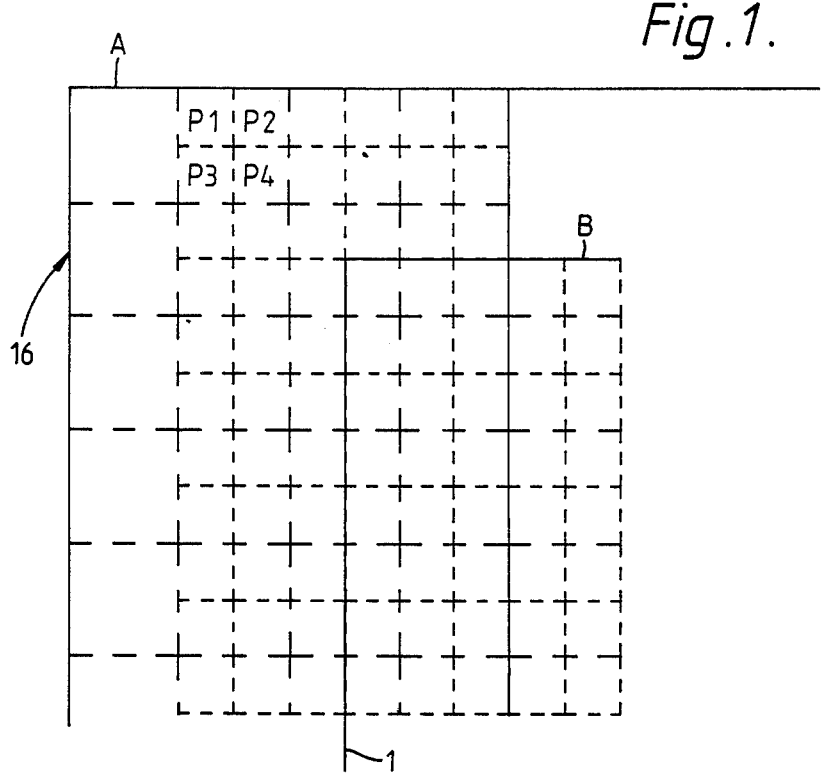
FIG. 1 illustrates part of a composite image defined by two overlapping subsidiary images.

In this example, a method of generating a composite image from two subsidiary images A, B will be described. Each of the subsidiary images is initially defined at the same low resolution by an array of pixels defined by digital data in a conventional manner. For example, the digital data for each pixel can define the colour component content of that pixel and will typically comprise an eight bit value for each colour component. FIG. 1 illustrates the two images A, B with the low resolution pixels being indicated by dashed lines. The final composite image will be output at a higher resolution, in this example four times the lower resolution, with image B positioned relative to image A as shown in FIG. 1. The high resolution pixels in the composite image are indicated by dotted lines in FIG. 1. It will be seen in FIG. 1 that image B is offset vertically by one and a half low resolution pixels and horizontally by two and half low resolution pixels relative to image A but in each direction by an exact number of high resolution pixels.

In a simple mode, it is desired to obtain a "hard" edge between the two images A, B. In this mode, if it is assumed that image B takes priority over image A then there will be a hard edge between the two images along the edge of the image B indicated by reference numeral 1 in FIG. 1. Thus, to the right of the line 1 the image B will appear while to the left of the line 1 the image A will appear.

Figure 2:
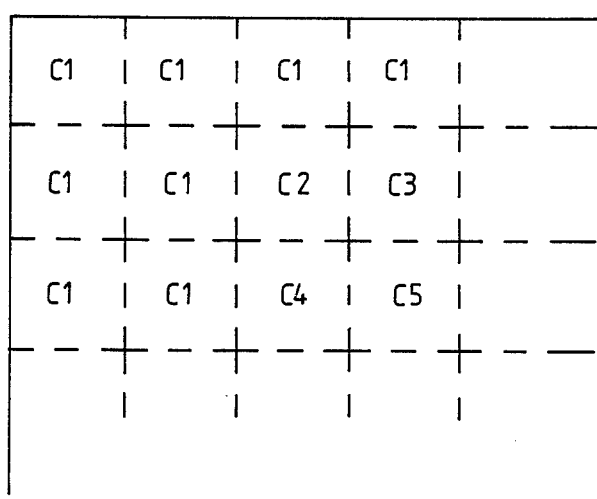
FIG. 2 illustrates part of a low resolution mask corresponding to the section of the composite image shown in FIG. 1.

In order to control the output scanner to generate the correct composite image, an array or mask of control data is provided, part of which is shown in FIG. 2. The generation of this mask will be described below. Prior to the output operation, the mask will be stored at the low resolution, each pixel of the mask corresponding to a low resolution pixel of the image A. Each pixel of the mask is defined by one of a number of control values, five of which are labelled C1–C5. These control values indicate the manner in which the four high resolution pixels P1–P4 within that low resolution pixel should be exposed.

Five control values C1–C5 are required to define the arrangement of the images A, B shown in FIG. 1 and these are defined in Table 1 below. It will be appreciated, however, that in practice more than five control values are required to be able to define all possible combinations of high resolution pixels that may be needed.

TABLE 1

| Control Value | Image A | Image B |
| --- | --- | --- |
| C1 | P1–P4 | |
| C2 | P1–P3 | P4 |
| C3 | P1, P2 | P3, P4 |
| C4 | P1, P3 | P2, P4 |
| C5 | | P1–P4 |

FIG. 2 illustrates the control values in the mask corresponding to the FIG. 1 composite image and it will be seen that the first horizontal line of low resolution pixels are all coded with the value C1 indicating that all high resolution pixels should be generated in accordance with image A. In the next horizontal line, the first two pixels are coded with the value C1 but the next low resolution pixel is coded with the value C2 since pixel P4 is to be exposed in accordance with image B while the remainder are to be exposed in accordance with image A. In the next pixel, the control value is C3 indicating that high resolution pixels P3, P4 should be exposed in accordance with image B while pixels P1, P2 should be exposed in accordance with image A. The coding of the next horizontal line is self-explanatory. It will be seen that the control data is defined at the low resolution but is able to control the combination of images at the high resolution.

We will now describe a typical apparatus for performing the method as outlined above.

Figure 3:
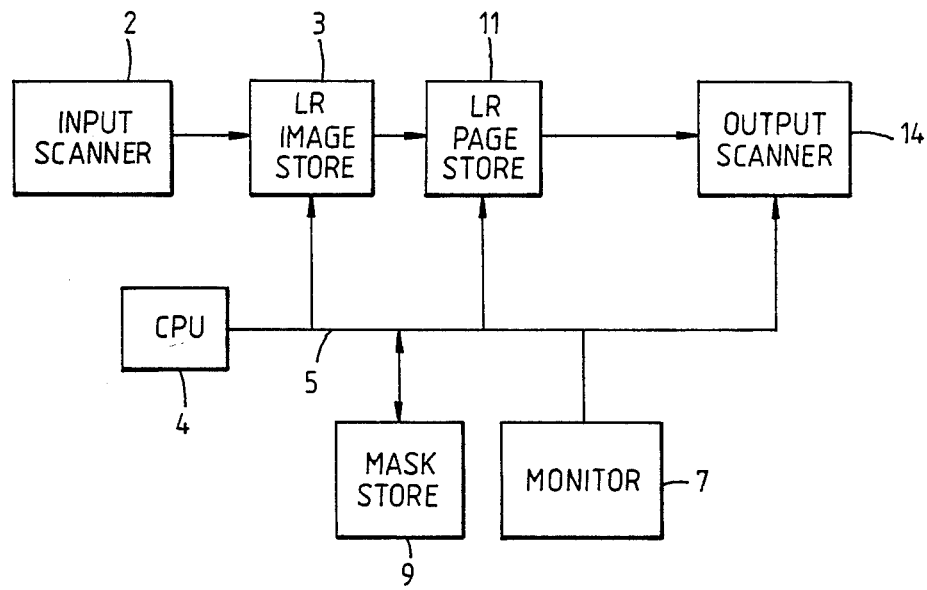
FIG. 3 is a block diagram of the apparatus.
Figure 4:
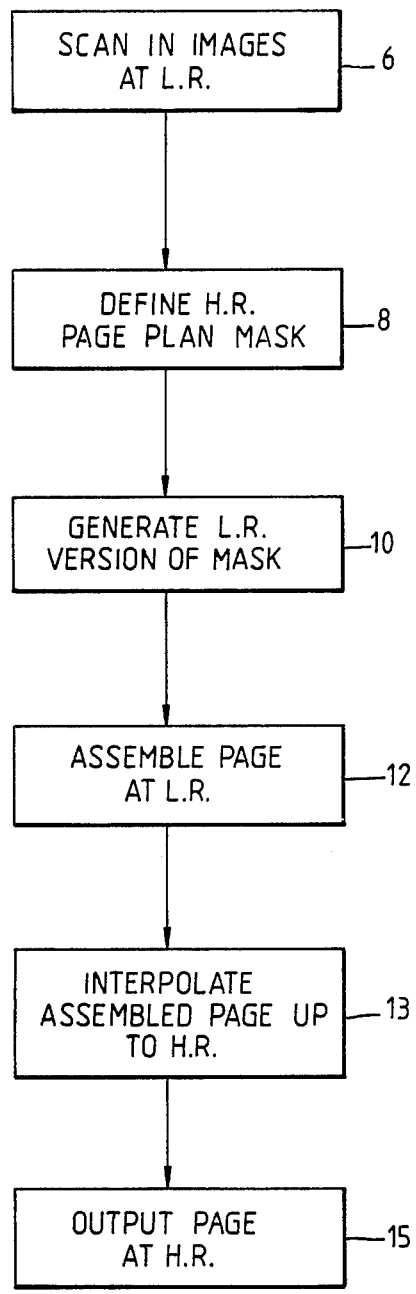
FIG. 4 is a flow diagram illustrating operation of the apparatus shown in FIG. 3; and, FIG. 5 illustrates schematically mask values used for generating a "hard" edge between images.

The apparatus comprises an input scanner 2 (FIG. 3) which may have any conventional form, such as our Magnascan system, the input scanner generating digital data defining the colour content of pixels of several images which are to be combined onto a single page. These images will be scanned at an input, low resolution (LR) and stored in an image store 3. The apparatus is controlled by a microprocessor 4 connected to the various components of the apparatus by a control bus 5. This initial scanning step is indicated by a step 6 in FIG. 4.

The operator then views the low resolution images in the image store 3 on a monitor 7 and defines the relative arrangement of the images which he wishes to see in the finished page at the required output, high resolution (step 8). This page planning process involves firstly determining the relative position of the images and then determining which of a pair of overlapping images should take priority. In the example described above, image B is chosen to take priority over image A. The result of this page planning step is to generate a page plan made at the high resolution, so that each pixel of the page plan mask corresponds to a single output resolution pixel. The high resolution page plan mask defines which of the images is to appear at each output pixel.

The high resolution mask is stored in a mask store 9.

The microprocessor 4 then reduces the resolution of the high resolution mask (step 10) to the same low resolution as the original images stored in the image store 3. This reduction can be performed in any suitable manner but for example may comprise utilizing groups of four high resolution pixels as addresses to a look-up table which contains for each address the appropriate control value C1, C2 etc. The result of this is the generation of the low resolution version of the mask part of which is shown in FIG. 2.

The microprocessor 4 then assembles the images stored in the store 3 into a low resolution version of the composite page under the control of the low resolution mask. At this stage, where an edge between the images occurs, the low resolution composite image will define data corresponding to one of the images even though part of the other image may appear within that low resolution pixel in the final composite output page. The assembled low resolution page is stored in a store 11 (step 12).

It will be appreciated that by storing both the mask and the assembled page at low resolution, much less storage space is required then has previously been necessary. Furthermore, the next step of interpolating the assembled page up to the high resolution (step 13) and outputting the page via the output scanner 14 (step 15) can take place in real time.

As the exposing beam of the output scanner 14 scans across the record medium (not shown) the corresponding low resolution pixels in the store 11 are scanned and interpolated up to the required output, high resolution. At the same time, the contents of the mask in the mask store 9 (FIG. 2) are accessed so that where an edge between the two images occurs, the exact position of the edge at the high resolution can be determined and, in the FIG. 1 example, appropriate high resolution pixels of image A can be suppressed. The exposing beam of the output scanner 14 is then controlled in accordance with the image A or image B information so that for example when scanning the horizontal line of high resolution pixels indicated by reference numeral 16 in FIG. 1, the output beam will switch from being modulated by image A to being modulated by image B midway through the third low resolution pixel.

Figure 5:
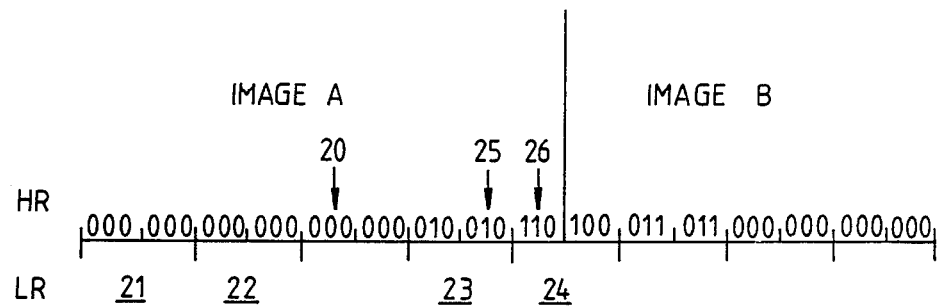

An alternative method for generating a hard edge between the images A, B will now be described with reference to FIG. 5. In this example, each low resolution pixel used to define the images and the mask at low resolution corresponds to two high resolution pixels. Thus, in FIG. 5 a line of eight low resolution pixels is illustrated with the junction between the two images occurring within the fifth low resolution pixel at the junction between the two high resolution pixels corresponding to that low resolution pixel. Initially, the mask data is stored at low resolution and prior to generating the higher resolution combined image, this mask data is interpolated up to high resolution to generate three digit binary values for each high resolution pixel, as shown in FIG. 5. This interpolation may be carried out using any conventional interpolation technique, for example by generating a weighted sum of the four nearest low resolution mask values to the mask pixel in question. In this example, the mask values at high resolution define the low resolution pixels in each image which are to be used in an interpolation method to generate the required high resolution pixel value. The interpolation used determines the weighted sum of the four nearest input, low resolution pixels (the two pixels on either side) to the pixel in question. In this example, the five binary values shown have the following meanings:

000—normal interpolation
010—replicate rightmost pixel, then interpolate
110—replicate two rightmost pixels and then interpolate
011—replicate leftmost pixel, then interpolate
100—replicate two leftmost pixels, then interpolate Thus, in FIG. 5, in the case of the high resolution pixel labelled 20 the corresponding image value will be determined by interpolating the low resolution values for pixels 21-24. For the high resolution pixel 25, since there is only one low resolution pixel of image A to the right of the pixel 25, a further low resolution pixel is generated by replicating the low resolution pixel 24 and the four low resolution pixel interpolation process is then carried out to generate the high resolution value for the pixel 25. Similarly, for pixel 26, the low resolution value of the pixel 24 is replicated twice to generate two further low resolution pixels to right of the pixel 26 before the interpolation is performed.

In a similar manner, replication, where necessary, is performed when generating the high resolution pixel values for image B adjacent to the edge with image A.

In an alternative mode which is a modification of the mode just described, a "soft" edge between the images can be generated. In this mode, where there is an overlap between the images as shown in FIG. 1, instead of completely suppressing one of the images within the overlap region, different percentages of the two images could be exposed. To achieve this, when defining the initial high resolution mask, the operator must specify the relative proportions of the two images which are to be displayed and this information will be stored and then compressed upon the generation of a low resolution version of the mask. Subsequently, during the output stage, the low resolution version of the mask as well as the low resolution version of the page must both be interpolated up to the high resolution before the exposing beam is controlled. Each control value in the interpolated up version of the mask will define the relative proportions of the two images within the overlap region and the exposing beam will be modulated accordingly.

Considering the line of high resolution pixels 16, (FIG. 1) the corresponding line in the high resolution mask might take the values:

00 00 00 00 00 01 10 11 11 11 these two digit control values having the meanings set out in Table 2 below:

TABLE 2

| Mask Value | Image A (percent) | Image B (Percent) |
|---|---|---|
| 00 | 100 | — |
| 01 | 67 | 33 |
| 10 | 33 | 67 |
| 11 | 0 | 100 |

We claim:
1. A method of generating a composite image on a record medium at a first resolution resulting from two subsidiary images defined by pixels at a second resolution lower than said first, the method comprising generating an array of control data at said second resolution, said control data indicating the relative locations of said subsidiary images in said composite image at said first and second resolutions, generating data defining said composite image at said second resolution under the control of said control data, interpolating said second resolution composite image up to said first resolution, the relative locations of said subsidiary images at the first resolution being determined in accordance with said control data, and causing said first resolution composite image to be recorded on said record medium.

2. A method according to claim 1, wherein each pixel of said array of control data contains data comprising at least two bits which are used to define the content of each second resolution pixel located within the area defined by the control data array pixel.

3. A method according to claim 1, wherein the control data array pixels which overlap the edge define those first resolution pixels located within the control data array pixel which are defined by one of said subsidiary images, the remaining first resolution pixel being defined by the other subsidiary image.

4. A method according to claim 1, further comprising, prior to interpolating said composite image, the step of interpolating said control data array up to said first resolution and subsequently interpolating said second resolution composite image up to said first resolution under the control of said interpolated control data array, the data content of each first resolution pixel of the interpolated control data array defining the relative proportions of the two subsidiary images at that pixel.

5. A method according to claim 1, wherein said step of generating said array of control data at said second resolution comprises generating a control data array at said first resolution and subsequently reducing the resolution of the control data array.

6. Apparatus for generating a composite image on a record medium at a first resolution resulting from two subsidiary images defined by pixels at a second resolution lower than the first, the apparatus comprising storage means for storing digital data defining subsidiary images and for storing an array of control data at said second resolution, said control data indicating the relative locations of the subsidiary images in the composite image at the first and second resolutions, and processing means for generating data defining said composite image at said second resolution under the control of the control data, for interpolating the second resolution composite image up to the first resolution, the relative locations of the subsidiary images at the first resolution being determined in accordance with the control data, and for causing an output device to record the composite image at the first resolution on a record medium.

* * * * *